United States Patent [19]

Frey

[11] Patent Number: 4,955,755
[45] Date of Patent: Sep. 11, 1990

[54] DEVICE FOR THE IN SITU REPAIR OF A PIPE

[76] Inventor: André F. Frey, 295 Rue du Général LeClerc, 57560 Abreschviller, France

[21] Appl. No.: 364,821

[22] Filed: Jun. 9, 1989

[30] Foreign Application Priority Data

Jun. 10, 1988 [FR] France .................. 88 07973

[51] Int. Cl.$^5$ ............................................. F16L 55/16
[52] U.S. Cl. ...................................... 405/155; 138/97; 405/154
[58] Field of Search ............... 405/154, 156, 155, 303; 138/97, 98

[56] References Cited

U.S. PATENT DOCUMENTS

| | | | |
|---|---|---|---|
| 2,851,061 | 9/1958 | Bernard et al. | 138/97 |
| 3,602,263 | 8/1971 | Bremner | 405/154 X |
| 4,371,569 | 2/1988 | Muta et al. | 427/230 |
| 4,377,984 | 3/1983 | Donnelly | 118/105 |
| 4,429,720 | 2/1984 | Beck et al. | 138/97 |
| 4,848,964 | 7/1989 | Yarnell | 405/154 |

FOREIGN PATENT DOCUMENTS

| | | |
|---|---|---|
| 0146331 | 6/1985 | European Pat. Off. . |
| 1398057 | 3/1964 | France . |
| 2579294 | 9/1986 | France .................. 138/97 |
| PCT/SE86/0-0528 | 6/1987 | PCT Int'l Appl. . |
| 990622 | 4/1965 | United Kingdom . |

Primary Examiner—Dennis L. Taylor
Attorney, Agent, or Firm—Hayes, Soloway, Hennessey & Hage

[57] ABSTRACT

A device for the in situ repair of pipes (e.g. stormwater or sewerage) inaccessible from the inside, comprises a front module (1) and a rear module (2) each module being fitted with mobile arms (3, 5) and hydraulic displacement means (4, 6) connectable to an hydraulic pump at surface level. In their inoperative position, the arms (3, 5) form a diameter which is much smaller than that of the pipe (7) to be repaired. In their operative position, the arms (3, 5) form a diameter which is either similar to or slightly smaller than that of the pipe (7) to be repaired. The front module (1) thus, through the pressure exerted by the arms on the damaged inside walls of the pipe (7), acts both as a widener and as a guide, to restore the pipe (7) to its original diameter and to facilitate passage along the pipe of the rear module (2). The rear module (2) is fitted at each end thereof with sealing elements (9) which, in conjunction with the pipe (7), define a chamber (10) into which leads at least one tube (11) for feeding sealing product, the tube being connectable to a pump (12) at surface level.

12 Claims, 5 Drawing Sheets

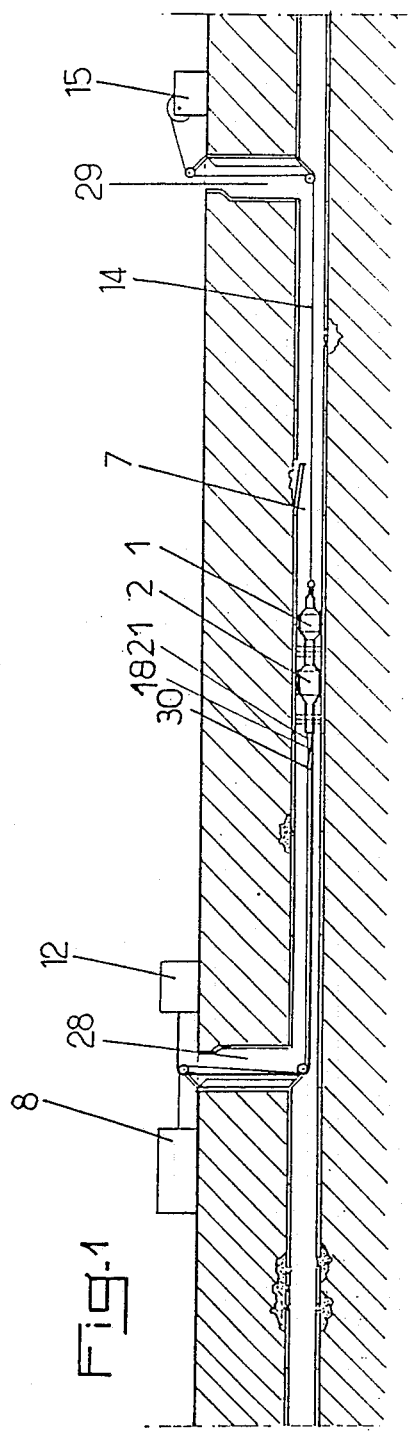
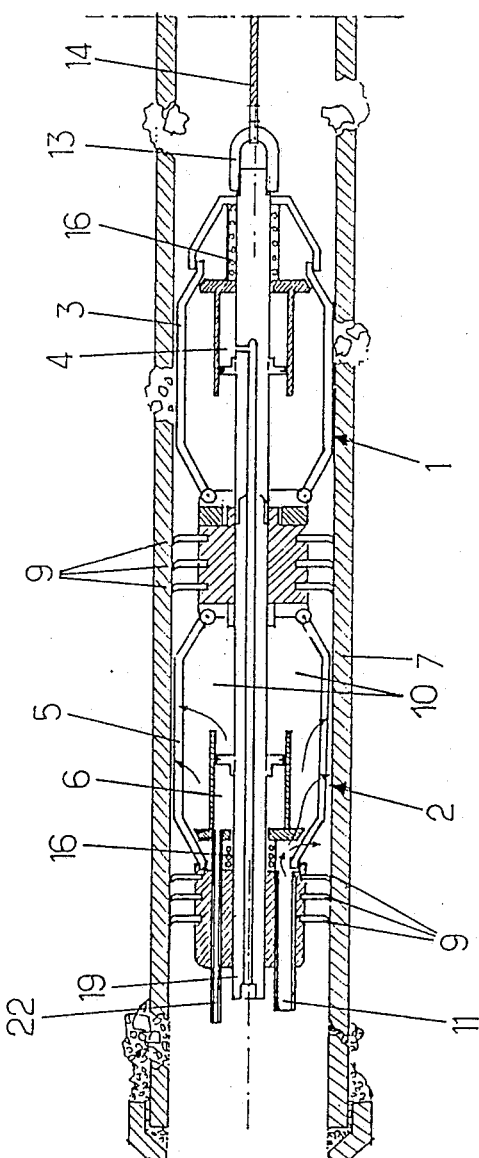
Fig.1
Fig.2

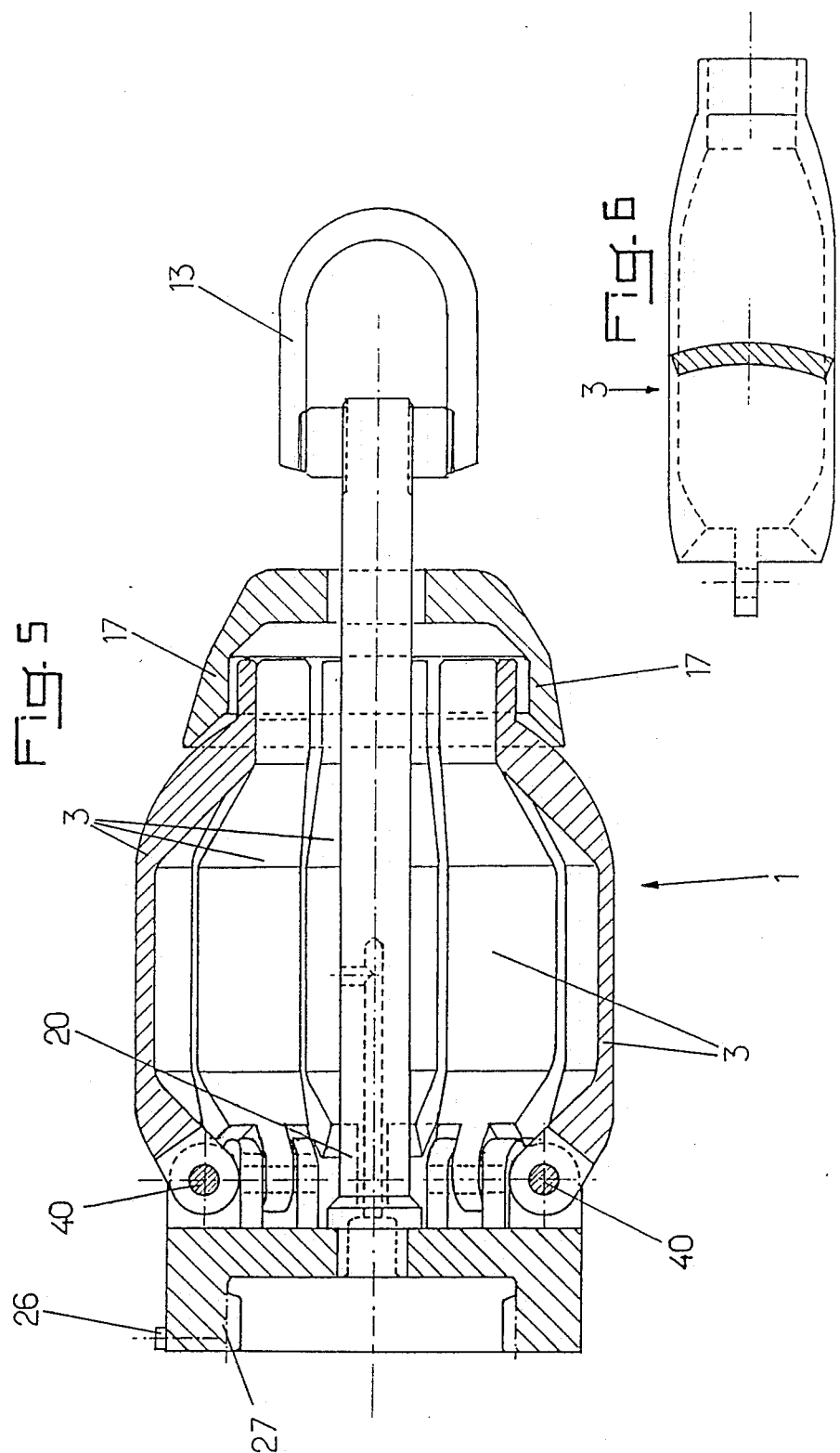

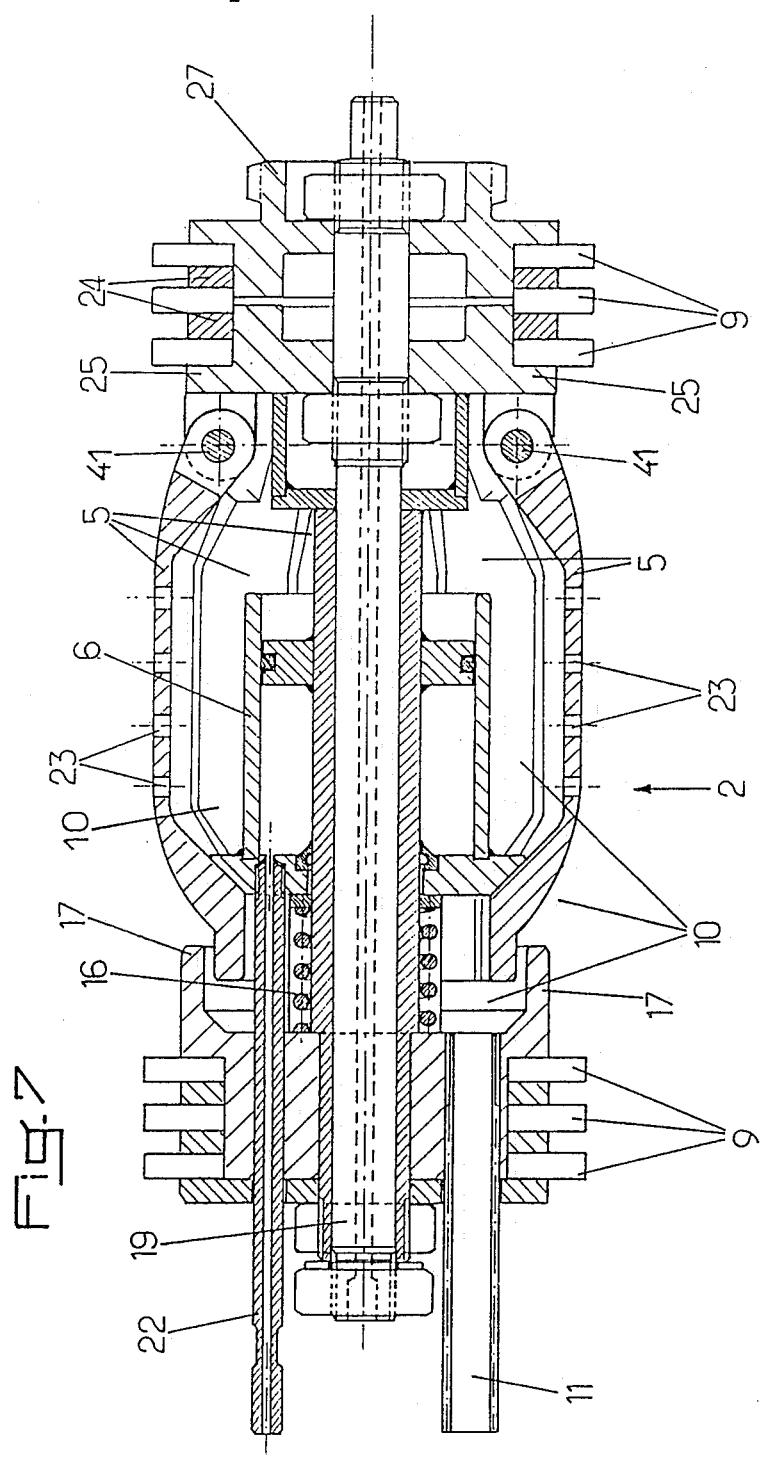

DEVICE FOR THE IN SITU REPAIR OF A PIPE

FIELD OF THE INVENTION

This invention relates to a device for the in situ repair of pipes by the injection under pressure of a sealing product, the device comprising a front module and a rear module. The device finds particular application in the repair of stormwater or sewerage pipes which are inaccessible from the inside owing to their small diameter.

BACKGROUND OF THE INVENTION

Pipes are often not readily accessible, either from the inside owing to their small diameter, or from the outside owing to the depth at which they are laid.

Whenever such pipes are found to leak, the leak can be sealed only by means of some device operating between two manholes providing access to the inside of the pipe. Existing devices for this purpose have many drawbacks, such as the difficulty in repairing the bottom of the pipe, the difficulty in sealing large cracks effectively and with lasting effect, the great deal of time needed to fill an entire section of pipe with sealing product, the need for the extensive surface equipment, and so on.

A previous device aimed at overcoming these drawbacks is described in French Pat. specification No. FR 85 04206. The device described there comprises a middle section the diameter of which is smaller than that of the pipe, and two end sections, front and rear respectively, which are connected to the middle section. Each end section is larger in diameter than the middle section. The device is provided with remote control and is fitted with sealing elements and a scraping mechanism.

However, the device has other drawbacks, the main one being its inability to move along very badly damaged pipes, for instance where part of the pipe has collapsed and only sections thereof still remain intact. In such a case, the device gets stuck in the pipe and cannot move forward. It may furthermore be difficult to retrieve the device by moving it backwards without damaging, sometimes very seriously, the sealing elements, and these must then be replaced.

Moreover, the device cannot be adapted to cater for pipes of various diameters. This is a serious drawback, inasmuch as pipes frequently vary widely in diameter, for example from 150 mm to more than 300 mm.

In addition, the device results in significant amounts of the sealing product being wasted, owing to the presence of a very large injection chamber between the two end sections. This chamber must be entirely filled with product, with the result that much thereof is wasted in the pipe. Furthermore, the pipe has to be cleaned following removal of the device.

Finally, the device does not allow for the repair of large longitudinal cracks, owing to instability of the sealing product which does not set well enough on the pipe walls following application.

Also, the need for extensive surface equipment still exists.

The main object of the present invention is to provide a device for the in situ repair of pipes which are inaccessible from the inside, which device, on the one hand, must allow for the repair even of collapsed pipes and pipes where wall sections have been stripped and are no longer present, without damaging the sealing elements, and, on the other hand, will cater for pipes of various diameters. In addition, the device must avoid any significant waste of the sealing product, whilst also allowing for the repair of large longitudinal cracks. Also no extensive surface equipment should be required.

SUMMARY OF THE INVENTION

This object is attained in the present invention by a device which comprises a front module and a rear module and is characterised in that:

each module is fitted with mobile arms and hydraulic displacement means connectable to an hydraulic pump at surface level, for displacing the arms;

the arms are displaceable between an inoperative position in which they form a diameter which is much smaller than that of the pipe to be repaired, and an operative position in which they form a diameter which is either similar to or slightly smaller than that of the pipe to be repaired, so that the front module, through pressure exerted by its arms on the damaged inside walls of the pipe, acts both as a widener and as a guide, to restore the pipe to its original diameter, and to facilitate passage along the pipe of the rear module; and the rear module is fitted at each opposite end thereof with sealing means which, in conjunction with the pipe, define a chamber into which leads at least one tube for feeding the sealing product, the tube being connectable to a pump at surface level.

Other features of the invention will become apparent from the description that follows.

For a better understanding of the present invention and to show how the same may be carried into effect, an example thereof will now be described with reference to the accompanying drawings.

BRIEF DESCRIPTION OF THE DRAWINGS

In the drawings:

FIG. 1 is a schematic longitudinal section which illustrates the working principle of a device in accordance with the invention;

FIG. 2 is a longitudinal section, drawn to a larger scale, of the device;

FIG. 5 is a longitudinal section, drawn to a different scale, of an alternative front module of the device, its hydraulic displacement mechanism having been omitted;

FIG. 6 is a view from the above of an arm of either the front or the rear module of the device; and FIG. 7 is a longitudinal section, drawn to a different scale, of an alternative rear module of the device.

DETAILED DESCRIPTION OF PREFERRED EMBODIMENTS

Figure 3:
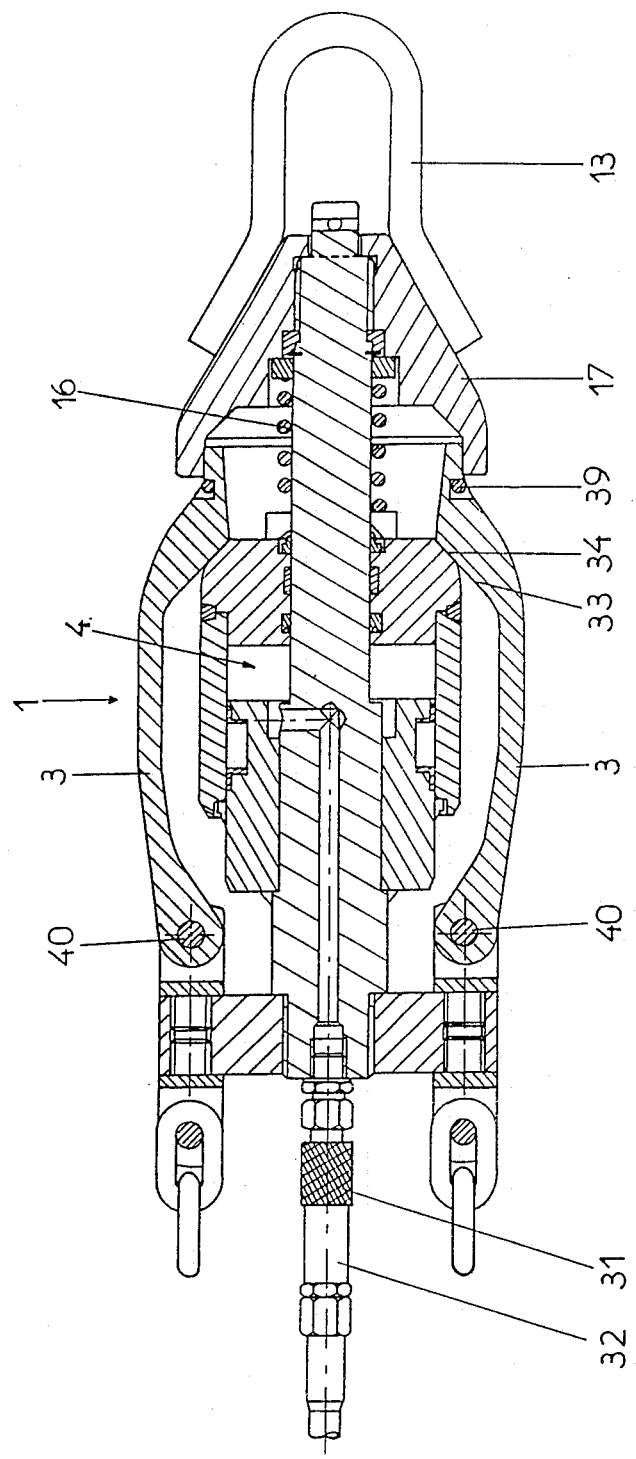
FIG. 3 is a longitudinal section, drawn to a different scale, of a front module of the device.

The repair device illustrated is characterised in that each module 1, 2 is fitted with mobile arms 3, 5 which are displaceable by means of an hydraulic displacement mechanism 4, 6 connected to an hydraulic pump 8 at surface level. Each of the modules 1, 2 preferably has six arms 3, 5. In their inoperative position, the arms 3, 5 form a diameter which is much smaller than that of the pipe 7 to be repaired. In the operative position, the arms 3, 5 form a diameter which is similar to or slightly smaller than that of the pipe 7 to be repaired, so that the front module 1, through pressure exerted by the arms 3 on the damaged inside walls of the pipe 7, acts both as a widener and as a guide, to restore the pipe 7 to its original diameter and to facilitate the passage of the rear module 2. Each end of the rear module is fitted with sealing elements 9 which, together with the pipe 7, define a chamber 10 into which leads at least one tube 11 for feeding sealing product. The tube 11 is connected to a pump 12 at surface level by means of, for example, flexible tubing 30. The flexible tubing 30 can be attached to the tube 11 by means of, for example, a quick coupling of the type available in the trade as CAMLOCK, which is manufactured by a company of the same name.

The front module acts both as a widener and as a guide, thus making it possible, as shown in FIG. 2, to clear the pipe 7 and to rebuild the various sections of wall which have either come off or collapsed, and this prior to any injection of sealing product. All supplies take place from the rear of the device, be this for the hydraulic displacement means 4, 6 or for the sealing product. Thus, the flexible feeder tubes cannot be damaged by sections of the walls of the pipe 7 which have not yet been repaired.

The front module 1 also allows for penetration into the pipe 7, even when pieces of wall are missing. In this event the ground itself is positioned in such a way as to form an arch.

According to an alternative assembly of the device, the two modules, front 1 and rear 2, are interconnected by means of an articulated part, for example a universal joint, a ball-joint, chains, or cables, so as to facilitate passage along pipes 7 which are not straight in that they change in direction and sometimes have elbows therein.

The main advantage of such an articulated connection is that it prevents the device from getting stuck in the pipe 7, as a result of changes in direction (subsidence, elbows, etc. . . . ).

Figure 4:
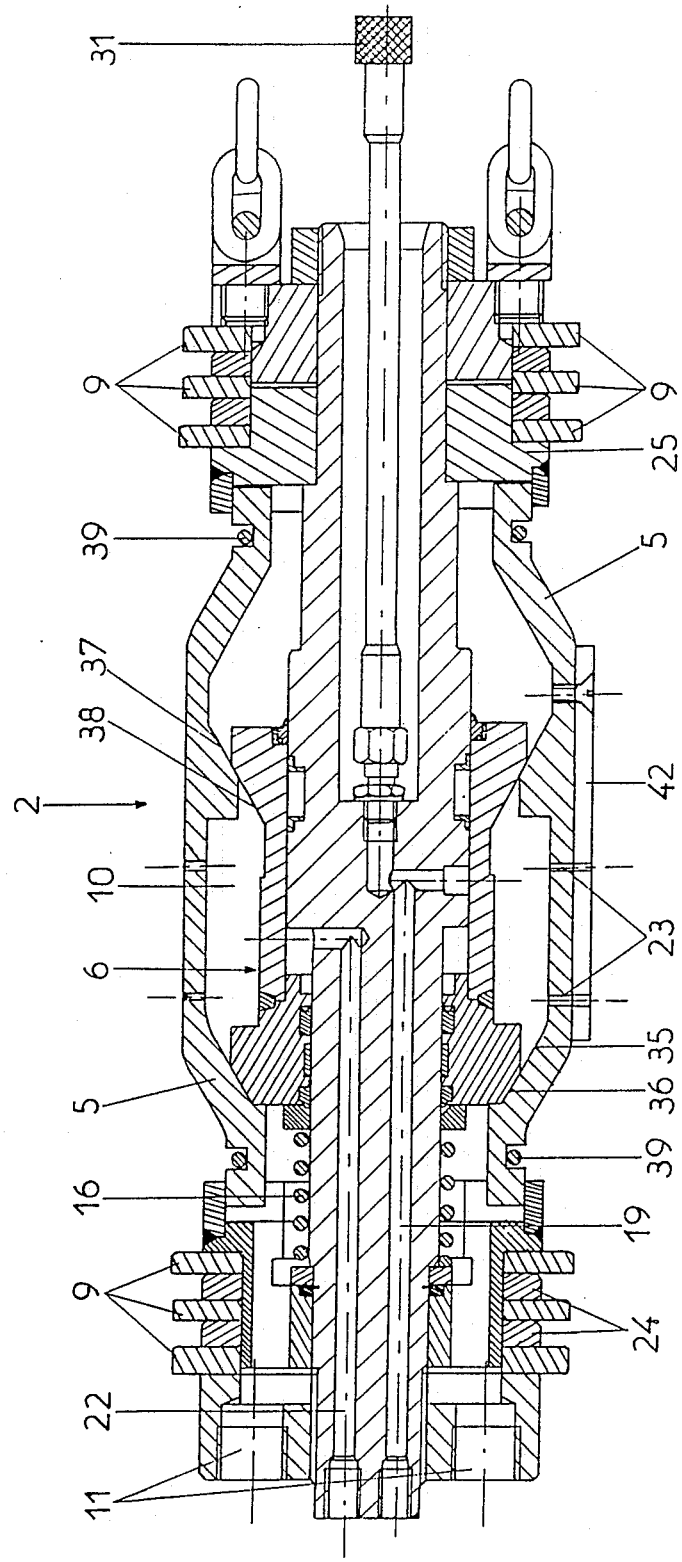
FIG. 4 is a longitudinal section, drawn to a different scale, of a rear module of the device.

FIGS. 3 and 4 show the two modules, front 1 and rear 2, of a device using chains. As shown here, the two modules, front 1 and rear 2, may be disconnected and then reconnected, for example by means of hydraulic quick couplings 31 and flexible hydraulic tubing 32. The flexible hydraulic tubing 32 connects the hollow central member 19 of the rear module 2 to the central member 20 of the front module 1.

According to a second alternative assembly of the device, as shown in FIGS. 5 and 7, the two modules, front 1 and rear 2, may be disconnected and then reconnected, for example by means of bolts 26 and threaded connections 27.

According to a further characteristic of the invention, and as shown in FIGS. 3 and 5, the front module 1 is provided with attachment means 13, in the form of a shackle which permits the device to be pulled along the pipe 7 using a winch cable 14 and a winch 15, preferably a hand-operated one, set up at surface level.

The fact that a hand-operated winch can be used is one of the many advantages of the invention. Because the front module 1 acts as a widener, it follows that the power necessary to move the device along the pipe 7 is relatively small. Therefore, a hand-operated winch 15 set up at surface level is sufficient to pull the entire device along, using the winch cable 14 (FIG. 1).

Another characteristic of the invention is that each hydraulic displacement mechanism 4, 6 is in the form of a hydraulic jack fitted with a return spring 16, this being effective to displace the arms 3, 5 to the operative position against a stop 17, by means of co-operating annular ramps 33, 34, 35, 36. The jack 4 is supplied via a flexible tube 18 connected at one end to the hydraulic pump 8 and at the other end to the rear end of a hollow central member 19 of the rear module 2. This member is itself connected to a central member 20 of the front module 1. The jack 6 is supplied via a flexible tube 21 connected at one end to the hydraulic pump 8 and at the other end to the rear end of the pipe 22 (FIGS. 4 and 7).

Consequently, and as already mentioned above, this structure allows for hydraulic supplies and supplies of sealing product to be carried out exclusively from the rear of the device.

As shown in FIGS. 5 and 7, each arm 3, 5 is pivotal about an articulation pin 40, 41 at the end opposite to that which is adjacent the stop 17.

The articulation pin 41 of the rear module (see FIG. 7) can be replaced by a second set of co-operating annular ramps 37, 38 as shown in FIG. 4.

Another characteristic of the invention is that each arm 3, 5 is kept in its inoperative position by a return spring 39.

Furthermore, the arms 3, 5 are provided with means for fitting plates 42 thereto. The plates 42 are used to adapt the device to pipes of various diameters (see FIG. 4).

As shown in FIGS. 3, 4, 5 and 7, the rear module 2 has six arms 5 (and if need be six plates 42). The arms 5 and the plates 42 have openings 23 for the passage of the sealing product.

The openings 23 allow for the sealing product to pass from the injection chamber 10 to the pipe walls 7, flowing not only between the arms 5, but also through them, via the openings 23.

Finally, as shown in FIGS. 4 and 7, sealing means 9 are provided at opposite ends of the rear module 2, each such sealing means comprising three disc-shaped elements of rubberised cloth. These elements are kept in place by washers 24 between adjacent elements and by a shoulder 25. The dimensions of the elements are such that they are able to withstand the pressure of the sealing product in the injection chamber 10, of the order of 1 to 1,5 bar.

Consequently it is possible to repair pipes 7 of various diameters (that may vary, as already indicated above, between 150 mm and more than 300 mm) by replacing only the sealing elements 9 and the washers 24 and by fitting to the arms 3, 5 plates 42 of the required thickness. The plates 42 are fitted by inserting screws in threaded holes present in the arms 3, 5.

Operation of the device is as follows:

First, the front module 1 is lowered into a manhole 28 (FIG. 1). Then, the winch cable 14 is fastened to the shackle 13 of the front module 1. The hand-operated winch 15 is then operated until the front module 1 has just entered the pipe 7.

Should there be sections to be repaired already at the beginning of the pipe, the arms 3 are displaced by starting the surface pump 8 which feeds into the flexible tubes 18, 21 and thus acts on the jack 4. The arms 3 position themselves against the walls of the pipe 7 (or what remains thereof), by moving a few millimetres until they abut against the stop 17. The pipe 7 is now back to its original diameter, or the ground is in a stable arch conforming to the inner profile of the pipe wall. Thereafter, the pump 8 is switched off and the jack 4 brings the arms 3 back to their initial position.

Thereafter, the rear module 2 is lowered into the manhole 28 and connected to the front module 1 (by means of the threaded connections 27 and bolts 26). The winch 15 is then operated so as to move the rear of the module 2 up to the entrance to the manhole 28. The arms 3 are then again pressurised so as to cause the next section of the pipe 7 to be restored to its original diameter. The arms 5 of the rear module 2 are displaced, at the same time or afterwards, by starting the surface pump 8 so that it acts on the jack 6. the arms 5 position themselves against the walls of the pipe 7, which have been pressed into place beforehand, by moving a few millimetres until they abut against the stop 17. The pump 12 is then switched on, and this injects the sealing product firstly into the injection chamber 10 and then onto the walls themselves. This injection takes place at a pressure of approximately 1 to 1,5 bar. The injection of sealing product lasts until the injection pressure becomes stabilised, which indicates that all cracks have been filled. Both Pumps 8 and 12 are then switched off.

Following a short waiting period (approximately 30 seconds) so that pre-hardening can take place, the winch 15 is operated once more, manually, so as to move the device along the pipe 7 a distance slightly less than the length of the injection chamber 10. This results in some overlapping and ensures that the entire pipe 7 is checked and treated.

Thereafter, if need be, the front module 1 is actuated again. The rear module 2 is also actuated, at the same time or afterwards.

This series of steps is repeated until the device has been moved along the entire stretch of pipe 7 to be repaired.

The two modules, front 1 and rear 2, are then separated from one another and removed through the manhole 29.

It is to be understood that the front module 1 may be used on its own when a slightly damaged pipe 7 is only to be unblocked and cleaned, without any injection of sealing product being necessary.

Furthermore, it is to be understood that the rear module 2 may be fitted with a second feeder tube 11 for sealing product, in cases where large amounts thereof need to be injected. Both tubes 11 will in that event be connected to the flexible tube 30.

The above description has shown the effectiveness of the device, as well as how easily it is implemented and moved along a pipe 7 to be repaired. This is due particularly to the presence of the front module 1 which acts both as a widener and as a guide, thus removing all obstacles such as loose fragments in the pipe 7 and restoring it to its original diameter. This facilitates the passage of the rear module 2, in turn allowing for perfect injection on the entire inner wall of the pipe 7, even where this wall is no longer existent. In the latter case, the ground itself is used as an external lining.

It will be understood that the invention is not restricted to the mode of assembly described and illustrated in the attached drawings. Modifications are possible, particularly to the design of the various components, or through the substitution of technical equivalents, whilst still remaining within the scope of the appended claims.

I claim:

1. A device for the in situ repair of a pipe by the injection under pressure of a sealing product, which device comprises a front module and a rear module and wherein:

each module includes radially displaceable arms and hydra displacement means, connectable to an hydraulic pump at surface level, for displacing the arms;

the arms are displaceable between an inoperative, radially retracted position and an operative, radially distended position, whereby the front module, through pressure exerted by its arms on the damaged inside walls of the pipe, can act both as a widener and as a guide, to restore the pipe to its original diameter and to facilitate passage along the pipe of the rear module;

the rear module includes, at each opposite end thereof, sealing means which, in conjunction with the pipe, define a chamber into which leads at least one passage for feeding sealing product, the passage being connectable to a pump for sealing product at surface level; and said radially displaceable arms of the rear module being disposed between the sealing means.

2. A device as claimed in claim 1, wherein the two modules, front and rear, are interconnected via an articulated connection, to facilitate passage of the device along a pipe which is not straight.

3. A device as claimed in claim 1, wherein the two modules, front and rear, are disconnectably interconnected, and including flexible hydraulic tubing with a disconnectable hydraulic connection for hydraulically connecting the hydraulic displacement means of the front module to the pump via the rear module.

4. A device as claimed in claim 1, wherein the two modules, front and rear, are disconnectably interconnected by means of threaded fasteners.

5. A device as claimed in claim 1, wherein the front module is provided with attachment means for the attachment to the front module of a winch cable.

6. A device as claimed in claim 1, wherein each hydraulic displacement means comprises a hydraulic jack fitted with a return spring, for displacing the arms to the operative position against a stop by means of co-operating ramps; wherein the jack of the front module is supplied via a flexible tube connectable at one end to the hydraulic pump and at the other end to the rear end of a hollow central member of the rear module, the central member of the rear module being connected to a central member of the front module; and wherein the jack of the rear module is supplied via a flexible tube connectable at one end to the hydraulic pump and at the other end to the rear module.

7. A device as claimed in claim 6, wherein each arm is pivotable about an articulation pin at the end opposite to that which is adjacent the stop.

8. A device as claimed in claim 6, wherein the arms and the central member of the rear module are provided with a second set of co-operating ramps.

9. A device as claimed in claim 1, wherein the arms are biased to the inoperative position by a return spring.

10. A device as claimed in claim 1, wherein the arms are provided with means for fitting thereto plates for adapting the device to pipes of various diameters.

11. A device as claimed in claim 1, wherein the arms of the rear module each have an opening therein for the passage therethrough of the sealing product.

12. A device as claimed in claim 1, wherein the sealing means at opposite ends of the rear module comprise a plurality of disc-shaped elements of rubberised cloth kept in place by spacers between adjacent elements and by a shoulder, the dimensions of the elements being such that they are able to withstand a pressure of the sealing product in the injection chamber, of in the order of 1 to 1,5 bar.

* * * * *